(12) United States Patent
Yan

(10) Patent No.: US 9,532,359 B2
(45) Date of Patent: Dec. 27, 2016

(54) RESOURCE ALLOCATION METHOD AND DEVICE

(71) Applicant: ZTE Corporation, Shenzhen (CN)

(72) Inventor: Juming Yan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/422,442

(22) PCT Filed: Aug. 19, 2013

(86) PCT No.: PCT/CN2013/081743
§ 371 (c)(1),
(2) Date: Feb. 19, 2015

(87) PCT Pub. No.: WO2014/029308
PCT Pub. Date: Feb. 27, 2014

(65) Prior Publication Data
US 2015/0223252 A1 Aug. 6, 2015

(30) Foreign Application Priority Data
Aug. 20, 2012 (CN) .......................... 2012 1 0295837

(51) Int. Cl.
*H04W 72/04* (2009.01)
*H04W 16/10* (2009.01)
(Continued)

(52) U.S. Cl.
CPC ......... *H04W 72/0486* (2013.01); *H04W 16/10* (2013.01); *H04W 24/08* (2013.01); *H04W 28/08* (2013.01); *H04W 88/12* (2013.01)

(58) Field of Classification Search
CPC .. H04W 72/0486; H04W 24/08; H04W 28/08; H04W 88/12
See application file for complete search history.

(56) References Cited

U.S. PATENT DOCUMENTS 7,904,546 B1 *  3/2011  Banda et al. ................. 709/224
2004/0009773 A1  1/2004  Kato
(Continued)

FOREIGN PATENT DOCUMENTS

| CN | 101114927 A | 1/2008 |
| CN | 101184114 A | 5/2008 |

(Continued)

OTHER PUBLICATIONS

International Search Report for corresponding application PCT/CN2013/081743 filed Aug. 19, 2013; Mail date Nov. 21, 2013.
(Continued)

*Primary Examiner* — Leon Flores
(74) *Attorney, Agent, or Firm* — Cantor Colburn LLP

(57) ABSTRACT

Provided are a resource allocation method and device. The method includes: monitoring a plurality of nodes of a shared resource pool, wherein the plurality of nodes include at least one node with the attribute of CP and at least one node with the attribute of UP; and according to a monitoring result, adjusting the attribute of one or more nodes in the plurality of nodes. The solution solves the technical problem of the waste of resources caused by the static configuration of resources in a resource pool in the related art, and achieves the technical effect of effectively utilizing resources and improving the service processing capability.

19 Claims, 7 Drawing Sheets

Monitoring a plurality of nodes of a shared resource pool, wherein the plurality of nodes include at least one node with the attribute of CP and at least one node with the attribute of UP — S102

According to the monitoring result, adjusting the attribute of one or more nodes in the plurality of nodes — S104

(51) Int. Cl.
*H04W 24/08* (2009.01)
*H04W 28/08* (2009.01)
*H04W 88/12* (2009.01)

(56) References Cited

U.S. PATENT DOCUMENTS

2009/0228890 A1   9/2009   Vaitovirta
2012/0198465 A1*  8/2012   Hande et al. ................. 718/104
2013/0090124 A1*  4/2013   Panchal et al. ............ 455/452.1

FOREIGN PATENT DOCUMENTS

WO   2011044396 A2   4/2011
WO   2012097875 A1   7/2012

OTHER PUBLICATIONS

Euorpean Search Report issued Dec. 9, 2015 re: Application No. PCT/CN2013/081743; pp. 1-10; citing: US 2009/228890 A1, US 2012/198465 A1, WO 2012/097875 A1 and WO 2011/044396 A2.

* cited by examiner

RESOURCE ALLOCATION METHOD AND DEVICE

TECHNICAL FIELD

The disclosure relates to the field of communications, and in particular to a resource allocation method and device.

BACKGROUND ART

In a mobile communication system, a radio network controller (RNC for short) divides service processing single boards into two categories according to the difference in processing protocols and functions:

1) a control plane processing board (CP for short), mainly used for processing transmission signalling and a wireless air interface control plane protocol; and 2) a user plane processing board (UP for short), mainly used for processing a wireless user plane protocol.

The CP and UP may further be divided into two categories respectively, one category being common CP and common UP, mainly used for processing protocols of respective common parts, for example: protocols of a cell, a common channel, etc.; and the other category being dedicated CP and dedicated UP, mainly used for processing functions relevant to specific dedicated user equipment (UE for short). The backup mode of the common CP and common UP is 1+1 backup, whereas that of the dedicated CP and dedicated UP is a resource pool manner, i.e. there are a dedicated CP resource pool and a dedicated UP resource pool.

In practical network operations, both the traditional dedicated CP resource pool and dedicated UP resource pool have a set of static configuration proportion, solidifying the number and proportion of the CP resource pool and the UP resource pool. With the decrease of the price of smart terminals and the popularization of Android system and smart mobile phones, there are an increasing number of smart terminals in a network. However, due to the requirement of power saving, a smart terminal may automatically initiate the change of a state, and its behaviour is not limited by the control of the RNC, thereby increasing the load of control plane signalling processing. From the analysis in terms of the service mode, a smart mobile phone user may frequently receive and send a mail, perform an instant messaging (IM for short) message call, etc. The time interval between receiving and sending may be several seconds. During the interval, in order to save power, the smart mobile phone generally actively releases a signalling connection and enters an idle mode. In this way, much connection/release will be caused, which occupies network resources, results in network congestion, and increases the load of the control plane (CP) and the user plane (UP) of the controller.

Applying a solidification method to allocation of nodes in a resource pool causes that resources cannot be utilized reasonably, which results in the waste of resource, and is also hardly to meet the complicated and variable service distribution and signalling storm in the existing wireless networks gradually.

Aiming at the problem above, no effective solution has been presented.

SUMMARY

An embodiment of the disclosure provide a resource allocation method and device, so as to at least solve the technical problem of the waste of resources caused by the static configuration of resources in a resource pool in the related art.

According to one embodiment of the disclosure, a resource allocation method is provided, including: monitoring a plurality of nodes of a shared resource pool, wherein the plurality of nodes include at least one node with the attribute of CP and at least one node with the attribute of UP; and according to a monitoring result, adjusting the attribute of one or more nodes in the plurality of nodes.

In an example embodiment, according to the monitoring result, adjusting the attribute of some or all nodes in the plurality of nodes includes: when it is detected that a total load of the at least one node with the current attribute of CP is greater than a first predetermined threshold value, and a total load of the at least one node with the current attribute of UP is smaller than a second predetermined threshold value, adjusting the attribute of one or more nodes with the current attribute of UP to be CP; and/or when it is detected that the total load of the at least one node with the current attribute of UP is greater than a third predetermined threshold value, and the total load of the at least one node with the current attribute of CP is smaller than the second predetermined threshold value, adjusting the attribute of one or more nodes with the current attribute of CP to be UP.

In an example embodiment, a ratio value of the number of users currently accessing a system to a maximum number of users capable of being supported by each node with the attribute of CP is taken as the current total load of the at least one node with the attribute of CP; and/or the current total load of the at least one node with the attribute of UP is determined according to a current central processing unit (CPU) load and media plane traffic.

In an example embodiment, the one or more nodes of which the attribute is adjusted are one or more nodes with the minimum current load.

In an example embodiment, before adjusting the attribute of one or more nodes in the plurality of nodes, the method further includes: judging whether one or more remaining nodes with the same attribute as the adjusted one or more nodes are capable of bearing, after the attribute of the one or more nodes is adjusted, a service load corresponding to the attribute.

In an example embodiment, adjusting the attribute of the one or more nodes in the plurality of nodes includes: sending an attribute adjustment instruction to each node to be adjusted, wherein the attribute adjustment instruction is used for instructing the node to change its current attribute; and if an adjustment completion indication message returned from the node is not received within a predetermined time, recovering the attribute of the node to the attribute before adjustment.

In an example embodiment, monitoring the plurality of nodes of the shared resource pool includes: periodically reporting, by each node in the shared resource pool, a current load of the node and a processing capability of the node; or periodically detecting, by a resource configuration management module, the current load and the processing capability of each node in the shared resource pool.

In an example embodiment, the CP is dedicated CP, and the UP is dedicated UP.

According to another embodiment of the disclosure, a resource allocation device is provided, including: a monitoring unit configured to monitor a plurality of nodes of a shared resource pool, wherein the plurality of nodes include at least one node with an attribute of control plane processing board (CP) and at least one node with an attribute of user plane processing board (UP); and an adjustment unit configured to, according to a monitoring result, adjust the attribute of one or more nodes in the plurality of nodes.

In an example embodiment, the adjustment unit includes: a first adjustment module configured to, when it is detected that a total load of the at least one node with the current attribute of CP is greater than a first predetermined threshold value, and a total load of the at least one node with the current attribute of UP is smaller than a second predetermined threshold value, adjust the attribute of one or more nodes with the current attribute of UP to be CP; and/or a second adjustment module configured to, when it is detected that the total load of the at least one node with the current attribute of UP is greater than a third predetermined threshold value, and the total load of the at least one node with the current attribute of CP is smaller than the second predetermined threshold value, adjust the attribute of one or more nodes with the current attribute of CP to be UP.

In an example embodiment, the adjustment unit further includes: a sending module configured to send an attribute adjustment instruction to each node to be adjusted, wherein the attribute adjustment instruction is used for instructing the node to change its current attribute; and a recovery module configured to, if an adjustment completion indication message returned from the node is not received within a predetermined time, recover the attribute of the node to the attribute before adjustment.

In the embodiments of the disclosure, the CP node and the UP node are allocated by means of a shared resource pool, such that dynamic switching may be implemented between the CP node and the UP node. The purpose of effectively utilizing resources may be achieved as long as the resources in the resource pool are monitored in real time and switching between node attributes is implemented according to the monitoring result. The method above solves the technical problem of the waste of resources caused by the static configuration of resources in a resource pool in the related art, and achieves the technical effect of effectively utilizing resources and improving the service processing capability.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
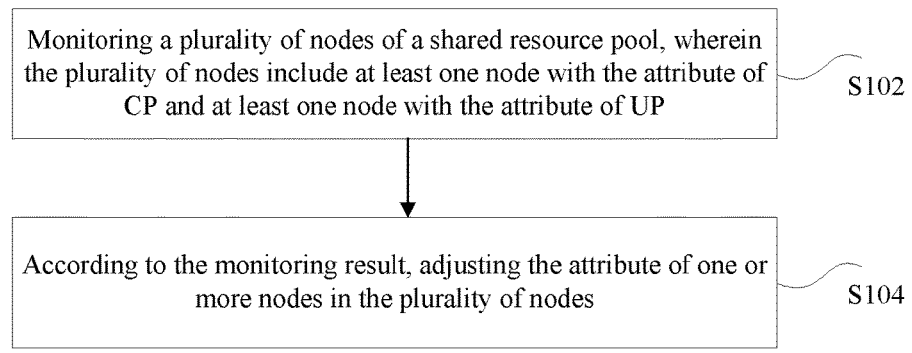
FIG. 1 is an example flowchart of a resource allocation method according to an embodiment of the disclosure.

An example embodiment of the disclosure provides a resource allocation method. As shown in FIG. 1, the method includes the steps of:

step S102: monitoring a plurality of nodes of a shared resource pool, wherein the plurality of nodes include at least one node with the attribute of CP and at least one node with the attribute of UP; and step S104: according to the monitoring result, adjusting the attribute of one or more nodes in the plurality of nodes.

In the example implementation above, the CP node and the UP node are allocated by means of a shared resource pool, such that dynamic switching may be implemented between the CP node and the UP. The purpose of effectively utilizing resources can be achieved as long as the resources in the resource pool are monitored in real time and switching between node attributes is implemented according to the monitoring result. The method above solves the technical problem of the waste of resources caused by the static configuration of resources in a resource pool in the related art, and achieves the technical effect of effectively utilizing resources and improving the service processing capability.

As regards the adjustment of the attribute of one or more nodes in the plurality of nodes performed according to the monitoring result, there are mainly two cases, one being to adjust the attribute of the node with the attribute of CP to be UP, and the other being to adjust the attribute of the node with the attribute of UP to be CP. Such adjustment above is mainly to implement load balancing, i.e. corresponding adjustment is performed mainly according to the processing load of the nodes with each attribute. In an example implementation, according to the monitoring result, adjusting the attribute of some or all nodes in the plurality of nodes includes:

1) when it is detected that the total load of the at least one node with the current attribute of CP is greater than a first predetermined threshold value, and the total load of the at least one node with the current attribute of UP is smaller than a second predetermined threshold value, adjusting the attribute of one or more nodes with the current attribute of UP to be CP; and/or 2) when it is detected that the total load of the at least one node with the current attribute of UP is greater than a third predetermined threshold value, and the total load of the at least one node with the current attribute of CP is smaller than the second predetermined threshold value, adjusting the attribute of one or more nodes with the current attribute of CP to be UP.

By means of performing adjustment according to respective loads, load balancing of nodes in a resource pool can be effectively achieved.

The determination of the load of CP and UP may apply different bases. For example, as regards the at least one node with the attribute of CP, the ratio value of the number of users currently accessing the system to the maximum number of users capable of being supported by each node with the attribute of CP may be taken as the current total load of the at least one node with the attribute of CP; and as regards the at least one node with the attribute of UP, the current total load of the at least one node with the attribute of UP may be determined according to the current CPU load and media plane traffic.

In order to ensure the minimum change to nodes, when it is determined that the attribute of a node needs to be adjusted, a processing method according to an example embodiment is to choose the node with the minimum current load to be adjusted. For example, when the load of CP is excessively great and one or more UP nodes need to be converted into one or more CP nodes, the one or more nodes with the minimum load in the UP nodes may be chosen to be converted. That is to say, the one or more nodes of which the attribute is adjusted are one or more nodes with the minimum current load.

In consideration of the number of nodes corresponding to the adjusted nodes possibly being hardly to bear the current service of the node after the node with one attribute is adjusted to be the other attribute, such adjustment is obviously unreasonable. In order to avoid the occurrence of such situation, the following judgement may be performed before adjustment: judging whether one or more remaining nodes with the same attribute as the adjusted one or more nodes are capable of bearing, if (after) the attribute of the one or more nodes is adjusted, a service load corresponding to the attribute.

Figure 2:
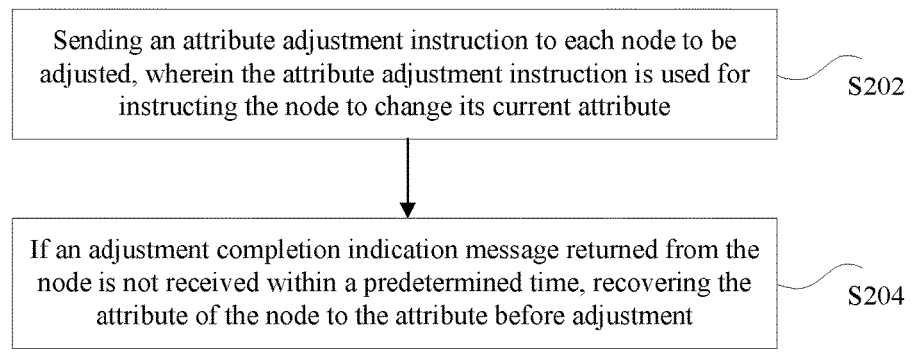
FIG. 2 is another example flowchart of a resource allocation method according to an embodiment of the disclosure.

In practical applications, adjustment abnormality may occur; therefore, a fallback operation may be added to the adjustment process. For example, one CP node may need to be adjusted to be a UP node; however, in the adjustment process, the node is not adjusted successfully, and thus an abnormality may occur. Therefore, a timer may be provided, and if a message of successful adjustment returned from the node is not received within a predetermined time, the attribute of the node is still set as CP. In one example implementation, as shown in FIG. 2, adjusting the attribute of one or more nodes in the plurality of nodes includes the steps of:

step S202: sending an attribute adjustment instruction to each node to be adjusted, wherein the attribute adjustment instruction is used for instructing the node to change its current attribute; and step S204: if an adjustment completion indication message returned from the node is not received within a predetermined time, recovering the attribute of the node to the attribute before adjustment.

The plurality of nodes in the shared resource pool may be monitored according to information actively reported by a node, or according to information actively checked by a resource configuration management module. In an example embodiment, the plurality of nodes in the shared resource pool may be monitored by but not limited to one of the following means:

1) periodically reporting, by each node in the shared resource pool, a current load of the node and a processing capability of the node; or 2) periodically detecting, by a resource configuration management module, the current load and the processing capability of each node in the shared resource pool.

In various example implementations above, the CP may be a dedicated CP, and the UP may be a dedicated UP.

Figure 3:
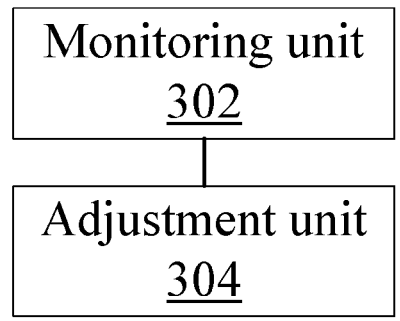
FIG. 3 is an example structural block diagram of a resource allocation device according to an embodiment of the disclosure.

A resource allocation device is further provided in this embodiment. The device is used for implementing the embodiments and example implementations above, and what has been described will not be stated redundantly. As will be used below, the term "unit" or "module" may be a combination of software and/or hardware implementing a predetermined function. Although the device described in the embodiments below is preferably implemented by means of software, the implementation of hardware or a combination of software and hardware may also be possible and conceivable. FIG. 3 is an example structural block diagram of a resource allocation device according to an embodiment of the disclosure. As shown in FIG. 3, the device includes: a monitoring unit 302 and an adjustment unit 304. The structure will be described below.

The monitoring unit 302 is configured to monitor a plurality of nodes of a shared resource pool, wherein the plurality of nodes include at least one node with the attribute of CP and at least one node with the attribute of UP; and the adjustment unit 304 is coupled with the monitoring unit 302 and is configured to, according to a monitoring result, adjust the attribute of one or more nodes in the plurality of nodes.

Figure 4:
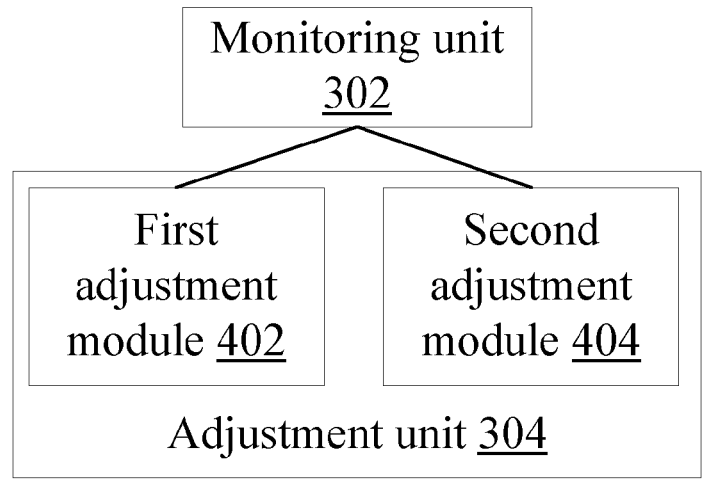
FIG. 4 is another example structural block diagram of a resource allocation device according to an embodiment of the disclosure.

In an example implementation, as shown in FIG. 4, the adjustment unit includes: a first adjustment module 402 coupled with the monitoring unit 302 and configured to, when it is detected that the total load of the at least one node with the current attribute of CP is greater than a first predetermined threshold value, and the total load of the at least one node with the current attribute of UP is smaller than a second predetermined threshold value, adjust the attribute of one or more nodes with the current attribute of UP to be CP; and/or a second adjustment module 404 coupled with the monitoring unit 302 and configured to, when it is detected that the total load of the at least one node with the current attribute of UP is greater than a third predetermined threshold value, and the total load of the at least one node with the current attribute of CP is smaller than the second predetermined threshold value, adjust the attribute of one or more nodes with the current attribute of CP to be UP.

Figure 5:
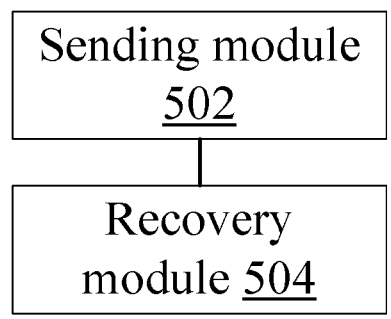
FIG. 5 is yet another example structural block diagram of a resource allocation device according to an embodiment of the disclosure.

In an example implementation, as shown in FIG. 5, the adjustment unit may further include: a sending module 502 configured to send an attribute adjustment instruction to each node to be adjusted, wherein the attribute adjustment instruction is used for instructing the node to change its current attribute; and a recovery module 504 coupled with the sending module 502 and configured to, if an adjustment completion indication message returned from the node is not received within a predetermined time, recover the attribute of the node to the attribute before adjustment.

The disclosure provides an example embodiment to further explain the disclosure; however, it should be noted that this example embodiment is merely to better describe the disclosure, but not constitutes inappropriate limitations to the disclosure.

In order to solve the problem that the traditional solidification configuration cannot adapt to the requirement of variability of the existing wireless network services, a control plane and a user plane processing board share a resource pool in the embodiments of the disclosure on the premise of the CP and UP both using the same kind of physical single boards, so as to increase the resource utilization rate and the whole processing capability of the system, and reduce the number of redundant single boards. Specifically, the dedicated CP resource pool and dedicated UP resource pool which are independent originally are combined to form a big resource pool. Each node in the resource pool is completely identical, and meanwhile, according to the current system load, each node may serve as dedicated CP, and may also serve as dedicated UP.

For example, with the normal operation of the system, when the whole UP load is very high, while the CP nodes are capable of bearing additional load, a certain node which serves as a CP function in the resource pool may be dynamically switched to serve as a UP function. Alternatively, when the whole CP load is very high, while the UP nodes are capable of bearing additional load, the attribute of a certain node which serves as a UP function in the resource pool may be switched to serve as a CP function.

Figure 6:
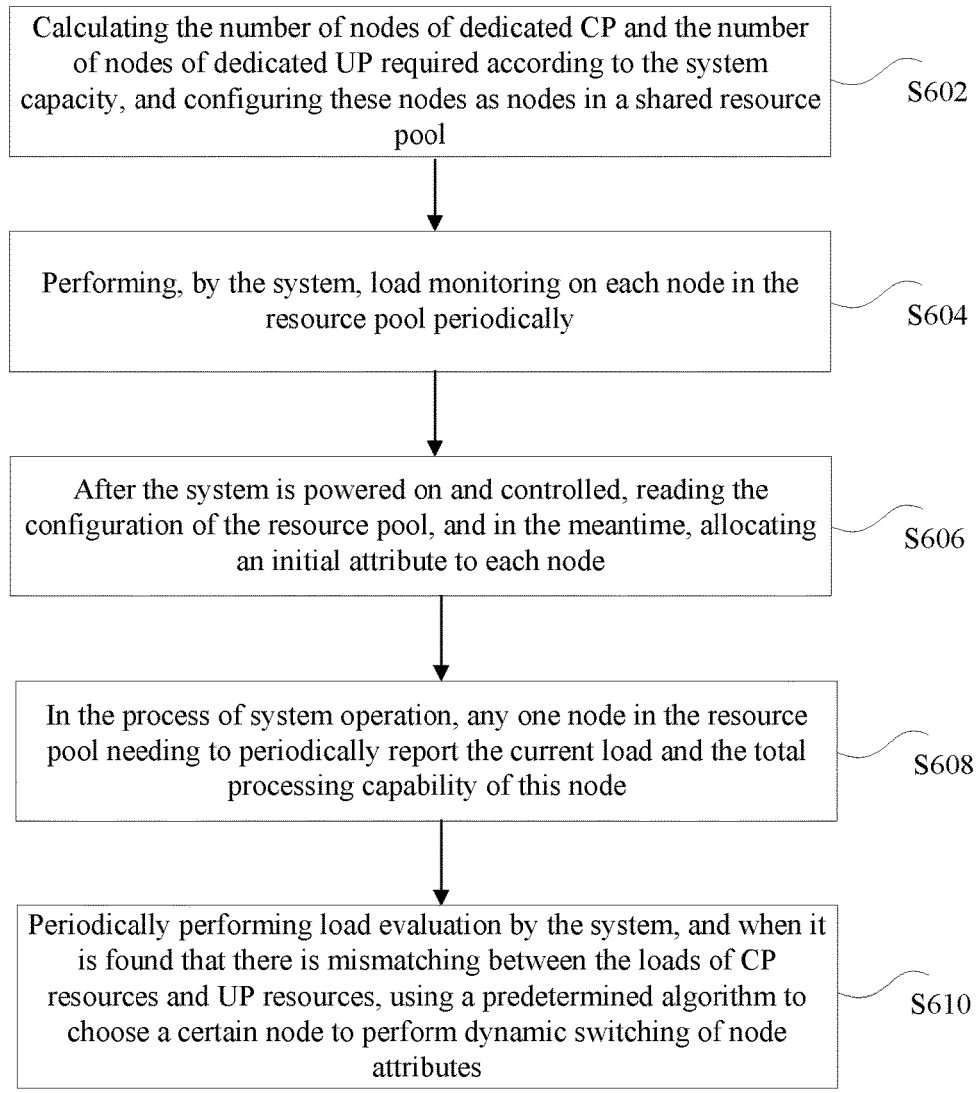
FIG. 6 is yet another example flowchart of a resource allocation method according to an embodiment of the disclosure.

In particular, as shown in FIG. 6, the resource allocation method includes the steps of:

step S602: calculating the number of nodes of dedicated CP and the number of nodes of dedicated UP required according to the system capacity, and configuring these nodes as nodes in a shared resource pool (in an example embodiment, the external attribute of each node does not need to be set);

step S604: performing, by the system, load monitoring on each node in the resource pool periodically, wherein as regards CP and UP, the load may be determined according to different conditions, for example, as regards a node with a CP attribute, the load may be but not limited to be a normalization load of the proportion of the number of current users to the maximum number of users supported by a single node; and as regards a node with a UP attribute, the load may be a normalization load after weighting the CPU load, media plane traffic, etc.;

step S606: after the system is powered on and controlled, reading the configuration of the resource pool, and in the meantime, allocating an initial attribute to each node, i.e. initially setting the node as a CP attribute or a UP attribute;

step S608: in the process of system operation, any one node in the resource pool periodically reporting the current load and the total processing capability of this node; and step S610: periodically performing load evaluation by the system, and when it is found that there is mismatching between the loads of CP resources and UP resources, i.e. when the current system network operation conditions result in insufficient resources of a certain party, while the other party still has a large amount of surplus, using a predetermined algorithm to choose to dynamically switch the node attribute of a certain node.

Two specific embodiments will be combined below for illustration, and in this example implementation, a resource pool having N nodes will be taken as an example for illustration.

Figure 7:
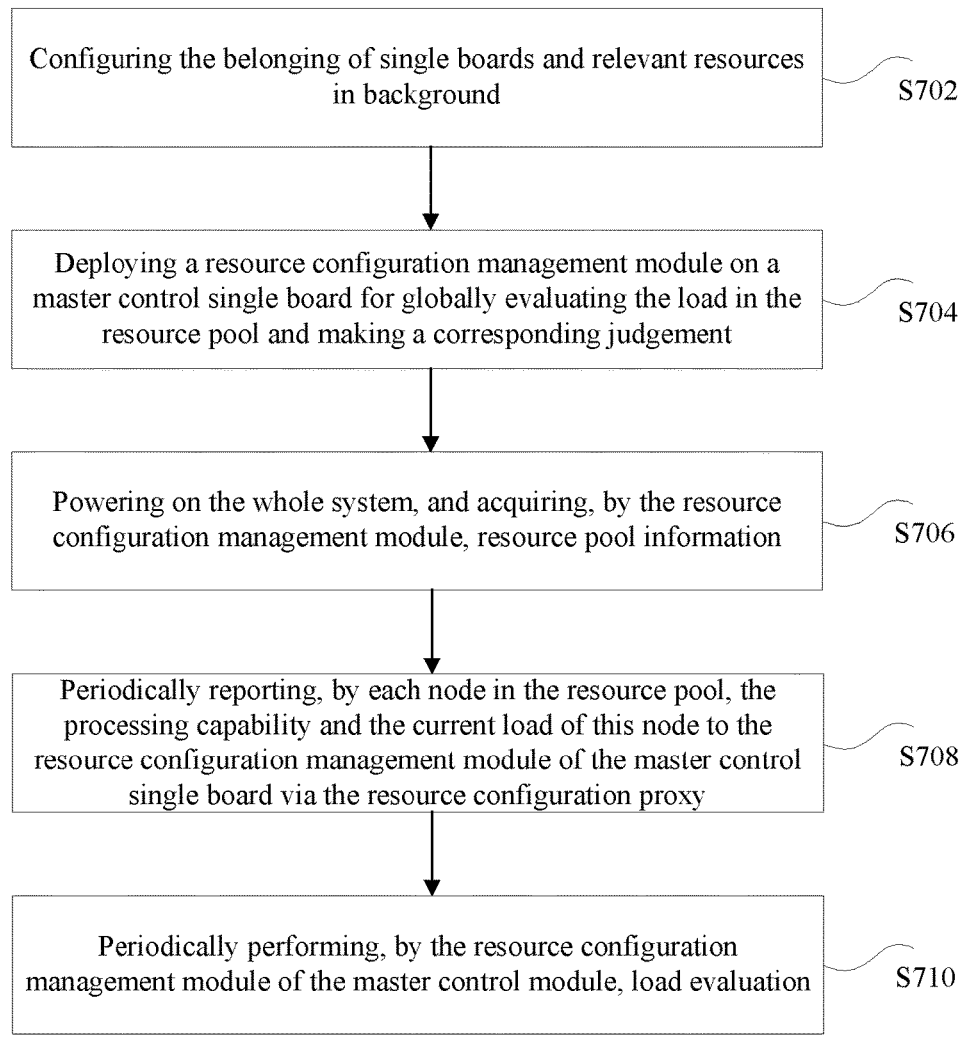
FIG. 7 is yet another example flowchart of a resource allocation method according to an embodiment of the disclosure.

As shown in FIG. 7, the resource allocation method includes the steps as follows:

step S702: single boards in the shared resource pool and related resource allocation are configured in background, such that a resource configuration management module in foreground knows how much capacity of a resource pool has been configured.

Figure 8:
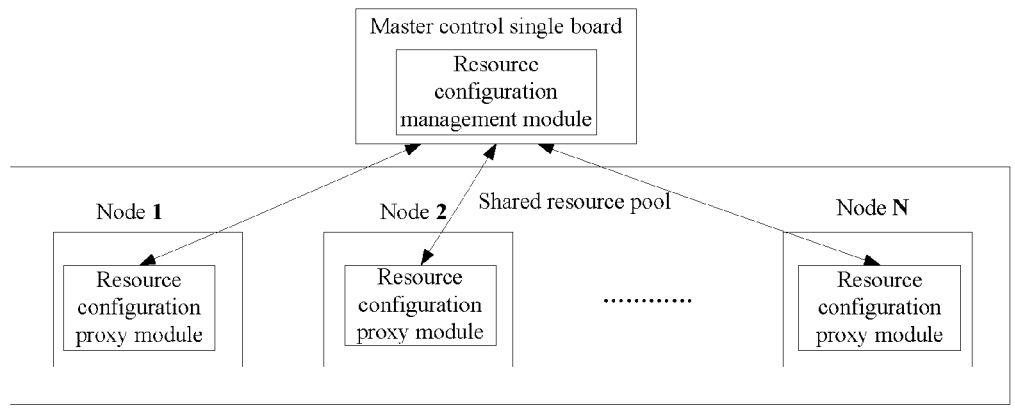
FIG. 8 is an example schematic structural diagram of a shared resource pool system according to an embodiment of the disclosure.

Step S704: as shown in FIG. 8, a resource configuration management module is deployed on a master control single board for globally evaluating the load in the resource pool and making a corresponding judgement. In an example embodiment, one resource configuration management proxy may be deployed in each resource pool node for calculating the load of this node, and then reporting the load to the resource configuration management module, and meanwhile, the resource configuration management proxy is also used for receiving a judgement command of the resource configuration management module.

Figure 9:
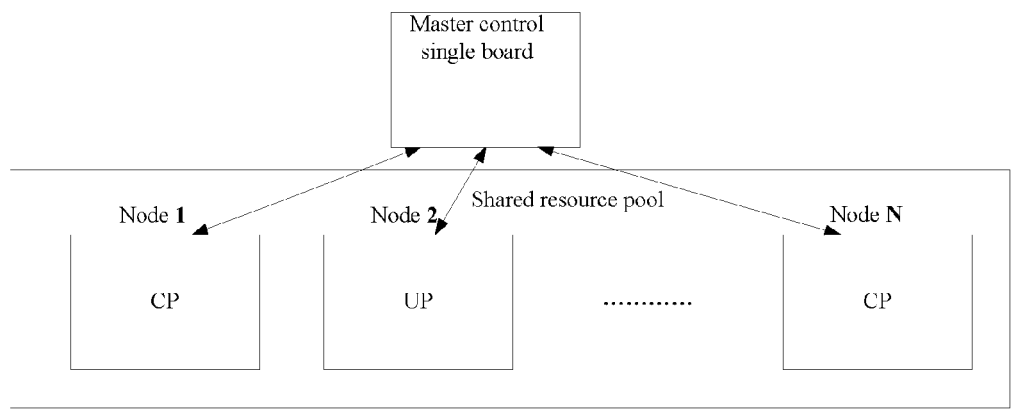
FIG. 9 is an example schematic diagram of initial allocation of a shared resource pool according to an embodiment of the disclosure.

Step S706: the whole system is powered on, and the resource configuration management module acquires resource pool information. As shown in FIG. 9, according to the traditional configuration, firstly an initial attribute is set for any one node in the resource pool, i.e. this node is with the attribute of CP or the attribute of UP.

Step S708: each node in the resource pool periodically (e.g. every 2 s) reports the processing capability and the current load of this node to the resource configuration management module of the master control single board via the resource configuration proxy.

Step S710: the resource configuration management module of the master control module periodically performs load evaluation, mainly including:

1) calculating the total CP processing capability of all nodes which are CP currently and operate normally in the resource pool, and the current total CP load, and 2) calculating the total UP processing capability of all nodes which are UP currently and operate normally in the resource pool, and the current total UP load.

Two specific implementations are illustrated below for describing the method above.

Implementation 1

Figure 10:
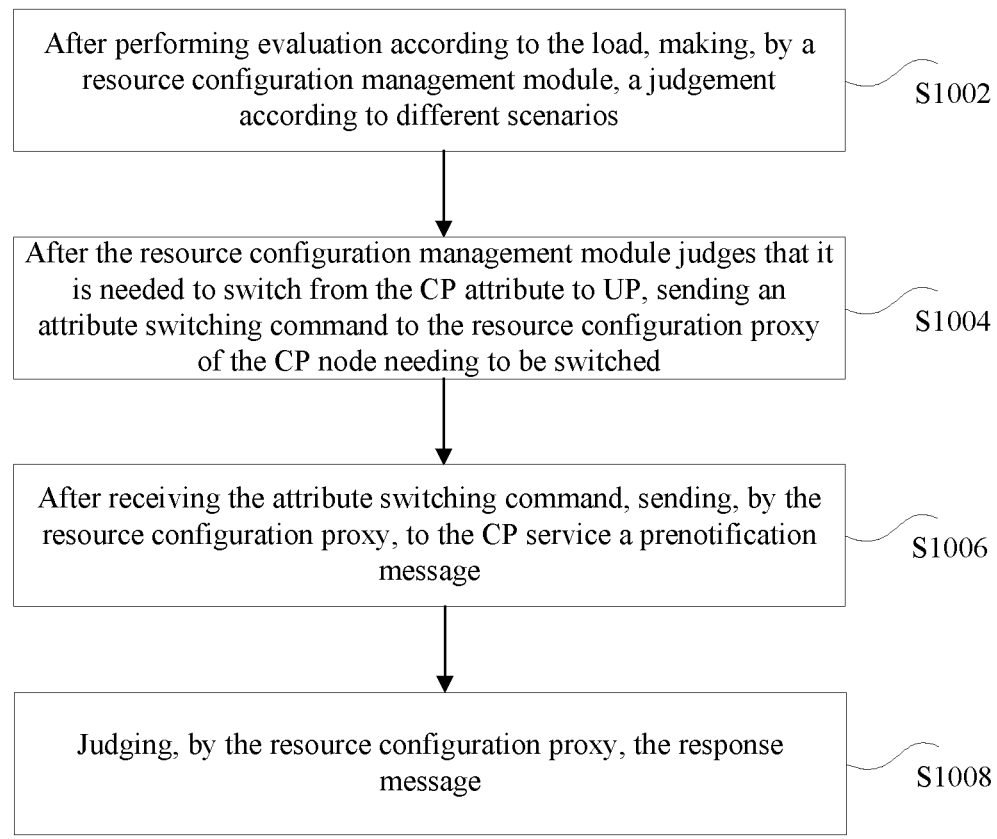
FIG. 10 is a flowchart of CP-to-UP attribute switching processing according to an embodiment of the disclosure.

This implementation describes switching a resource pool single board from a control plane (CP) to a user plane (UP). As shown in FIG. 10, the CP-to-UP attribute switching processing includes the steps of:

step S1002: after performing evaluation according to the load, making, by a resource configuration management module, the following judgement according to different scenarios:

scenario A: if the current total CP load is a light load state compared to the total processing capability (in an example embodiment, a threshold value may be decided by means of configuration), powering off a CP node with the minimum load in the resource pool;

scenario B: if the current total CP load is a non-light load state compared to the total processing capability but the processing capability has surplus, maintaining this state; and scenario C: if the current total UP load is a high load state compared to the total processing capability, the processing capability cannot support the current load, and some CP nodes in the system need to be switched to the UP attribute, performing the processing of:

S1: judging whether there is a UP node which has been powered off in the resource pool, and if so, directly recovering the UP node which has been powered off to be powered on;

S2: if there is no UP node which has been powered off, then judging whether there is a CP node which has been powered off in the resource pool, and if so, powering on the CP node which has been powered off, and switching the attribute of the node to UP;

S3: if there is no CP node which has been powered off in the resource pool, then choosing a CP node with the lowest load from a CP node pool, and meanwhile, calculating whether the total remaining CP processing capability after removing the calculation capability of the CP node is sufficient to support the current CP load, and if so, determining to switch the attribute of the node from CP to UP; and S4: if the total remaining CP processing capability after removing the calculation capability of the CP node is insufficient to support the current CP load, maintaining this state;

step S1004: after the resource configuration management module judges that it is needed to switch the CP node from the CP attribute to UP, sending an attribute switching command to the resource configuration proxy of the CP node needing to be switched;

step S1006: after receiving the attribute switching command, sending, by the resource configuration proxy, to the CP service a prenotification message to notify the node that the attribute will be switched to UP soon, and providing a waiting timer, the timer being used for judging whether the switching can be successfully completed within a predetermined time; after having received the message, judging, by the CP service, whether the service volume, service form, etc. on the current CP node allows switching, and if so, starting to perform relevant service migration, etc.; and after service aftermath work is processed completely, returning an attribute switching response message to the resource configuration proxy; and step S1008: judging, by the resource configuration proxy, the response message, mainly including:

1) if the service in the response message acknowledges that the CP node can perform attribute switching, then performing, by the resource configuration proxy, operation software switching, and operating UP software; and then notifying the resource configuration management module to update information and relevant node states; and 2) if the service in the response message acknowledges that the current CP node cannot perform attribute switching due to some situations, then terminating, by the resource configuration proxy, a final switching action, and then notifying the resource configuration management module to perform state fallback, the attribute of the CP node still being CP.

Implementation 2

Figure 11:
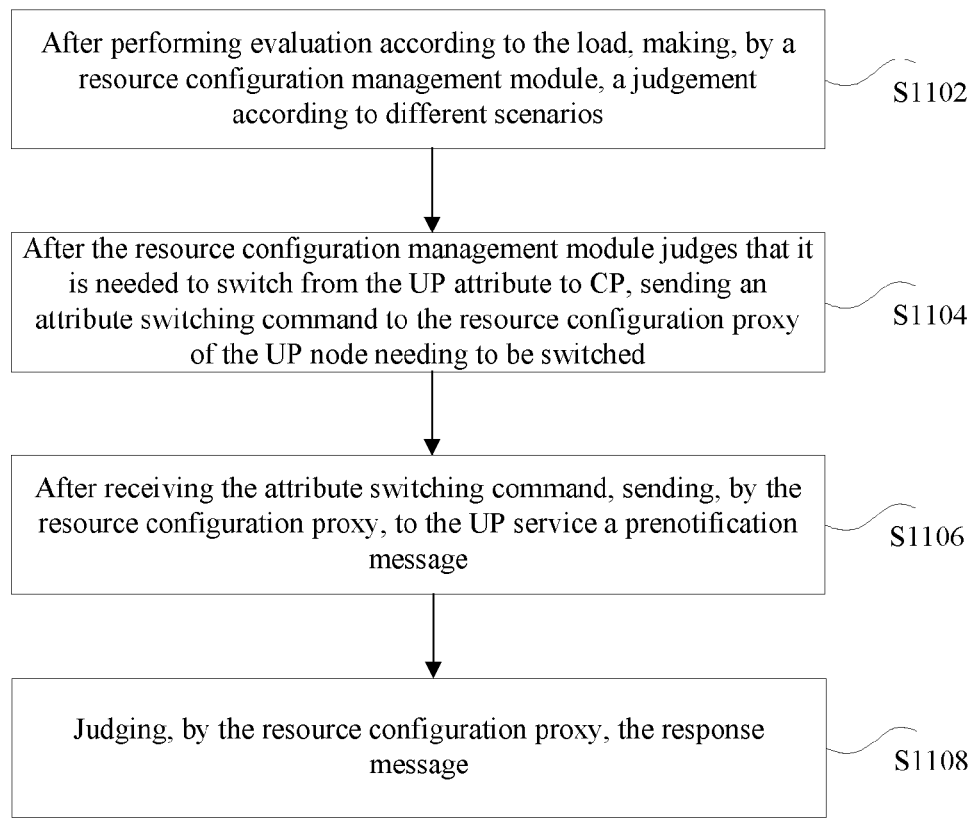
FIG. 11 is a flowchart of UP-to-CP attribute switching processing according to an embodiment of the disclosure.

This implementation describes switching a resource pool single board from a user plane (UP) to a control plane (CP). As shown in FIG. 11, the UP-to-CP attribute switching processing includes the steps of:

step S1102: after performing evaluation according to the load, making, by a resource configuration management module, the following judgement according to different scenarios:

scenario A: if the current total UP load is a light load state compared to the total processing capability (in an example embodiment, a threshold value may be decided by means of configuration), powering off a UP node with the minimum load in the resource pool;

scenario B: if the current total UP load is a non-light load state compared to the total processing capability but the processing capability has surplus, maintaining this state; and scenario C: if the current total CP load is a high load state compared to the total processing capability, the processing capability cannot support the current load, and some UP nodes in the system need to be switched to the CP attribute, performing the processing of:

S1: judging whether there is a CP node which has been powered off in the resource pool, and if so, directly recovering the CP node which has been powered off to be powered on;

S2: if there is no CP node which has been powered off, then judging whether there is a UP node which has been powered off in the resource pool, and if so, powering on the UP node which has been powered off, and switching the attribute of the node to CP;

S3: if there is no UP node which has been powered off in the resource pool, then choosing a UP node with the lowest load from a UP node pool, and meanwhile, calculating whether the total remaining UP processing capability after removing the calculation capability of the UP node is sufficient to support the current UP load, and if so, determining to switch the attribute of the node from UP to CP; and S4: if the total remaining UP processing capability after removing the calculation capability of the UP node is insufficient to support the current UP load, maintaining this state;

step S1104: after the resource configuration management module judges that it is needed to switch the UP node from the UP attribute to CP, sending an attribute switching command to the resource configuration proxy of the UP node needing to be switched;

step S1106: after receiving the attribute switching command, sending, by the resource configuration proxy, to the UP service a prenotification message to notify the node that the attribute will be switched to CP soon, and providing a waiting timer, the timer being used for judging whether the switching can be successfully completed within a predetermined time; after having received the message, judging, by the UP service, whether the service volume, service form, etc. on the current UP node allows switching, and if so, starting to perform relevant service migration, etc.; and after service aftermath work is processed completely, returning an attribute switching response message to the resource configuration proxy; and step S1108: judging, by the resource configuration proxy, the response message, mainly including:

1) if the service in the response message acknowledges that the UP node can perform attribute switching, then performing, by the resource configuration proxy, operation software switching, and operating CP software; and then notifying the resource configuration management module to update information and relevant node states; and 2) if the service in the response message acknowledges that the current UP node cannot perform attribute switching due to some situations, then terminating, by the resource configuration proxy, a final switching action, and then notifying the resource configuration management module to perform state fallback, the attribute of the UP node still being UP.

In another embodiment, also provided is software, the software being used for executing the embodiments above and the technical solutions described in example implementations.

In another embodiment, also provided is a storage medium, the storage medium storing the software mentioned above, and the storage medium including but not limited to an optical disk, a floppy disk, a hard disk, an erasable storage device, etc.

From the description above, it can be seen that the embodiments of the disclosure achieve the technical effects as follows: the CP node and the UP node are allocated by means of a shared resource pool, such that dynamic switching may be implemented between the CP node and the UP. The purpose of effectively utilizing resources can be achieved as long as the resources in the resource pool are monitored in real time and switching between node attributes is implemented according to the monitoring result. The method above solves the technical problem of the waste of resources caused by the static configuration of resources in a resource pool in the related art, and achieves the technical effect of effectively utilizing resources and improving the service processing capability.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. All modifications, equivalents and improvements, which are made within the principle of the disclosure, should be included in the protection scope defined by the claims of the disclosure.

What is claimed is:

1. A resource allocation method, comprising:
   monitoring a plurality of nodes of a shared resource pool, wherein the plurality of nodes comprise at least one node with an attribute of control plane processing board (CP) and at least one node with an attribute of user plane processing board (UP); and
   according to a monitoring result, adjusting the attribute of one or more nodes in the plurality of nodes;
   wherein the shared resource pool comprises the dedicated CP resource pool and dedicated UP resource pool, wherein the CP is dedicated CP, and the UP is dedicated UP.

2. The method according to claim 1, wherein according to the monitoring result, adjusting the attribute of some or all nodes in the plurality of nodes comprises:
   when it is detected that a total load of the at least one node with the current attribute of CP is greater than a first predetermined threshold value, and a total load of the at least one node with the current attribute of UP is smaller than a second predetermined threshold value, adjusting the attribute of one or more nodes with the current attribute of UP to be CP; and/or
   when it is detected that the total load of the at least one node with the current attribute of UP is greater than a third predetermined threshold value, and the total load of the at least one node with the current attribute of CP is smaller than the second predetermined threshold value, adjusting the attribute of one or more nodes with the current attribute of CP to be UP.

3. The method according to claim 2, wherein
   a ratio value of the number of users currently accessing a system to a maximum number of users capable of being supported by each node with the attribute of CP is taken as the current total load of the at least one node with the attribute of CP; and/or
   the current total load of the at least one node with the attribute of UP is determined according to a current central processing unit (CPU) load and media plane traffic.

4. The method according to claim 3, wherein adjusting the attribute of the one or more nodes in the plurality of nodes comprises:
   sending an attribute adjustment instruction to each node to be adjusted, wherein the attribute adjustment instruction is used for instructing the node to change its current attribute; and
   when an adjustment completion indication message returned from the node is not received within a predetermined time, recovering the attribute of the node to the attribute before adjustment.

5. The method according to claim 3, wherein monitoring the plurality of nodes of the shared resource pool comprises:
   periodically reporting, by each node in the shared resource pool, a current load of the node and a processing capability of the node; or
   periodically detecting, by a resource configuration management module, the current load and the processing capability of each node in the shared resource pool.

6. The method according to claim 2, wherein adjusting the attribute of the one or more nodes in the plurality of nodes comprises:
   sending an attribute adjustment instruction to each node to be adjusted, wherein the attribute adjustment instruction is used for instructing the node to change its current attribute; and
   when an adjustment completion indication message returned from the node is not received within a predetermined time, recovering the attribute of the node to the attribute before adjustment.

7. The method according to claim 2, wherein monitoring the plurality of nodes of the shared resource pool comprises:
   periodically reporting, by each node in the shared resource pool, a current load of the node and a processing capability of the node; or
   periodically detecting, by a resource configuration management module, the current load and the processing capability of each node in the shared resource pool.

8. The method according to claim 1, wherein the one or more nodes of which the attribute is adjusted are one or more nodes with the minimum current load.

9. The method according to claim 8, wherein adjusting the attribute of the one or more nodes in the plurality of nodes comprises:
   sending an attribute adjustment instruction to each node to be adjusted, wherein the attribute adjustment instruction is used for instructing the node to change its current attribute; and
   when an adjustment completion indication message returned from the node is not received within a predetermined time, recovering the attribute of the node to the attribute before adjustment.

10. The method according to claim 8, wherein monitoring the plurality of nodes of the shared resource pool comprises:
    periodically reporting, by each node in the shared resource pool, a current load of the node and a processing capability of the node; or
    periodically detecting, by a resource configuration management module, the current load and the processing capability of each node in the shared resource pool.

11. The method according to claim 1, wherein before adjusting the attribute of the one or more nodes in the plurality of nodes, the method further comprises:
    judging whether one or more remaining nodes with the same attribute as the adjusted one or more nodes are capable of bearing, after the attribute of the one or more nodes is adjusted, a service load corresponding to the attribute.

12. The method according to claim 11, wherein adjusting the attribute of the one or more nodes in the plurality of nodes comprises:
sending an attribute adjustment instruction to each node to be adjusted, wherein the attribute adjustment instruction is used for instructing the node to change its current attribute; and
when an adjustment completion indication message returned from the node is not received within a predetermined time, recovering the attribute of the node to the attribute before adjustment.

13. The method according to claim 11, wherein monitoring the plurality of nodes of the shared resource pool comprises:
periodically reporting, by each node in the shared resource pool, a current load of the node and a processing capability of the node; or
periodically detecting, by a resource configuration management module, the current load and the processing capability of each node in the shared resource pool.

14. The method according to claim 1, wherein adjusting the attribute of the one or more nodes in the plurality of nodes comprises:
sending an attribute adjustment instruction to each node to be adjusted, wherein the attribute adjustment instruction is used for instructing the node to change its current attribute; and
when an adjustment completion indication message returned from the node is not received within a predetermined time, recovering the attribute of the node to the attribute before adjustment.

15. The method according to claim 1, wherein monitoring the plurality of nodes of the shared resource pool comprises:
periodically reporting, by each node in the shared resource pool, a current load of the node and a processing capability of the node; or
periodically detecting, by a resource configuration management module, the current load and the processing capability of each node in the shared resource pool.

16. A resource allocation device, comprising:
a monitoring unit configured to monitor a plurality of nodes of a shared resource pool, wherein the plurality of nodes comprise at least one node with an attribute of control plane processing board (CP) and at least one node with an attribute of user plane processing board (UP); and
an adjustment unit configured to, according to a monitoring result, adjust the attribute of one or more nodes in the plurality of nodes;
wherein the shared resource pool comprises the dedicated CP resource pool and dedicated UP resource pool; the CP is dedicated CP, and the UP is dedicated UP.

17. The device according to claim 16, wherein the adjustment unit comprises:
a first adjustment module configured to, when it is detected that a total load of the at least one node with the current attribute of CP is greater than a first predetermined threshold value, and a total load of the at least one node with the current attribute of UP is smaller than a second predetermined threshold value, adjust the attribute of one or more nodes with the current attribute of UP to be CP; and/or
a second adjustment module configured to, when it is detected that the total load of the at least one node with the current attribute of UP is greater than a third predetermined threshold value, and the total load of the at least one node with the current attribute of CP is smaller than the second predetermined threshold value, adjust the attribute of one or more nodes with the current attribute of CP to be UP.

18. The device according to claim 17, wherein the adjustment unit further comprises:
a sending module configured to send an attribute adjustment instruction to each node to be adjusted, wherein the attribute adjustment instruction is used for instructing the node to change its current attribute; and
a recovery module configured to, when an adjustment completion indication message returned from the node is not received within a predetermined time, recover the attribute of the node to the attribute before adjustment.

19. The device according to claim 16, wherein the adjustment unit further comprises:
a sending module configured to send an attribute adjustment instruction to each node to be adjusted, wherein the attribute adjustment instruction is used for instructing the node to change its current attribute; and
a recovery module configured to, if an adjustment completion indication message returned from the node is not received within a predetermined time, recover the attribute of the node to the attribute before adjustment.

* * * * *